United States Patent
Christiansen et al.

(10) Patent No.: US 12,501,857 B2
(45) Date of Patent: Dec. 23, 2025

(54) RESIDUE SPREAD MONITORING

(71) Applicant: AGCO International GmbH, Neuhausen (CH)

(72) Inventors: Martin Peter Christiansen, Randers (DK); Ramon Buchaca Tarragona, Randers (DK); Morten Stigaard Laursen, Randers (DK); Kenneth Düring Jensen, Randers (DK)

(73) Assignee: AGCO International GmbH, Neuhausen (CH)

( * ) Notice: Subject to any disclaimer, the term of this patent is extended or adjusted under 35 U.S.C. 154(b) by 102 days.

(21) Appl. No.: 18/554,069

(22) PCT Filed: May 9, 2022

(86) PCT No.: PCT/IB2022/054283
§ 371 (c)(1),
(2) Date: Oct. 5, 2023

(87) PCT Pub. No.: WO2022/243786
PCT Pub. Date: Nov. 24, 2022

(65) Prior Publication Data
US 2024/0188493 A1    Jun. 13, 2024

(30) Foreign Application Priority Data
May 19, 2021  (GB) ..................... 2107124

(51) Int. Cl.
*A01D 41/12*    (2006.01)
*A01D 41/127*   (2006.01)
*G01S 17/88*    (2006.01)

(52) U.S. Cl.
CPC ....... *A01D 41/1243* (2013.01); *A01D 41/127* (2013.01); *G01S 17/88* (2013.01)

(58) Field of Classification Search
CPC .... A01D 41/1243; A01D 41/127; G01S 17/88
See application file for complete search history.

(56) References Cited

U.S. PATENT DOCUMENTS

| 5,569,081 A | 10/1996 | Baumgarten et al. |
| 7,261,633 B2 * | 8/2007 | Benes ................ A01D 41/1243 460/111 |

(Continued)

FOREIGN PATENT DOCUMENTS

EP    3187034 B1    2/2019

OTHER PUBLICATIONS

Uk Intellectual Property Office, Search report for related UK Application No. GB2107124.6, dated Feb. 16, 2022, 4 pages.

(Continued)

*Primary Examiner* — Michael J Zanelli

(57) ABSTRACT

Systems and methods are provided for monitoring and controlling the distribution of residue material from a spreader tool of an agricultural machine. A sensor is mounted to the machine and has a sensing region rearwards of the agricultural machine. Using data from the sensor a distribution of residue material associated with the spreader tool is determined. Based on this distribution, one or more operational parameters of the agricultural machine or one or more components thereof are controlled to achieve a desired or improved residue spread from the spreader tool.

16 Claims, 5 Drawing Sheets

(56) References Cited

U.S. PATENT DOCUMENTS

| | | |
|---|---|---|
| 10,537,062 B2 | 1/2020 | Brubaker |
| 10,694,670 B2 | 6/2020 | Gresch et al. |
| 10,820,502 B2* | 11/2020 | Beavers ............... A01D 43/086 |
| 2011/0270495 A1 | 11/2011 | Knapp |
| 2018/0310474 A1 | 11/2018 | Posselius et al. |
| 2019/0327889 A1 | 10/2019 | Borgstadt |
| 2020/0077584 A1 | 3/2020 | Miller et al. |
| 2021/0034867 A1* | 2/2021 | Ferrari ................. G05D 1/0236 |
| 2021/0084820 A1* | 3/2021 | Vandike ............... A01B 79/005 |

OTHER PUBLICATIONS

European Patent Office, Search report for related PCT Application No. PCT/IB2022/054283, dated 02 AGO 2022, 14 pages.

\* cited by examiner

RESIDUE SPREAD MONITORING

CROSS-REFERENCE TO RELATED APPLICATIONS

This application is a national phase entry under 35 U.S.C. § 371 of International Patent Application PCT/IB2022/054283, filed May 9, 2022, designating the United States of America and published in English as International Patent Publication WO 2022/243786A1 on Nov. 24, 2022, which claims the benefit of the filing date of U.K. Patent Application 2107124.6 "Residue Spread Monitoring," filed May 19, 2021, the entire disclosure of which is incorporated herein by reference.

TECHNICAL FIELD

The present invention relates, in general, to systems and methods for monitoring and controlling residue spread from a harvesting machine.

BACKGROUND

Agricultural combines work to cut crop material from a field before separating the grain from the material other than grain (MOG) (referred to interchangeably as "residue") on board. Generally, the grain is transferred to a grain bin of the combine (where it may be temporarily stored) and the MOG is deposited back onto the field. A second operation may be performed to gather the deposited MOG, or the MOG may be used as a fertiliser for the soil in the field. In either case, it is important for the MOG to be distributed evenly during deposition, in order to ensure an efficient second harvesting operation (e.g. bailing of the MOG) or to ensure effective fertilisation of the soil. When residue is unevenly distributed over a field, not only are exposed areas at risk for erosion, but inconsistencies in soil temperatures and moisture also may cause uneven plant emergence the following year, hurting yield. Ideally, residue should be spread consistently and managed to promote uniform rapid warming and drying in the spring for earlier planting and sufficient seed germination. It is also important not to spread MOG or residue into standing crop adjacent to the machine—i.e. the crop to be harvested on the next pass by the machine—as spreading into standing crop may result in the same area being spread twice causing an unwanted built of residue in a given area, again leading to uniformity issues.

To control the distribution of the MOG, known combines include spreader tools which can include deflectors/steering vanes, rotors or the like which are controllable by an operator of the combine. Generally, this is a manual process and the operator must observe the distribution of the MOG during operation and make any necessary adjustments to the spreader tool manually. The distribution of the MOG can be affected by numerous operating conditions, including wind speed, water content of the material, gradient of the field, etc. Accordingly, observing and adjusting the spreader tool manually can be relatively complex and time consuming, especially where the operating conditions vary across the area to be harvested.

In an attempt to address this problem it is known to utilise sensors, e.g. wind direction sensors, ultrasonic sensors, cameras and the like operable to infer or monitor the distribution of the MOG in real time. In some instances, information relating to the observed distribution may be relayed to the operator of the combine (e.g. through a user interface within the operator cab) who may use this information to adjust operation of the spreader tool. In further solutions, control of the spreader tool has been at least partly automated based on data from such sensors, for example by controlling the direction of one or more steering vanes/deflectors in an attempt to account for wind direction. However, such systems are relatively complex and no complete solution has been realised.

It would be advantageous to improve upon these known systems such that the distribution of material from an agricultural machine can be monitored and optionally controlled more effectively and efficiently.

SUMMARY OF THE INVENTION

In an aspect of the invention there is provided a system for controlling the distribution of residue material from a spreader tool of an agricultural machine, the system comprising: a sensor having a sensing region rearwards of the agricultural machine; and one or more controllers, configured to: receive data from the sensor indicative of a measure of residue material within the sensing region; employ a data buffer of a predetermined time period for the data received from the sensor; determine, from the data buffer of sensor data received from the sensor, a distribution of residue material associated with the spreader tool for the predetermined time period associated with the buffer; and output one or more control signals for controlling one or more operational parameters of the agricultural machine or one or more components thereof in dependence on the determined distribution.

Advantageously, the arrangement of the present invention allows for the distribution of residue distributed by the spreader tool to be monitored and controlled efficiently. Utilising a data buffer to monitor the distribution over a time period may provide a clearer overall visualisation of the distribution compared with an instantaneous snapshot of the sensor data. This is particularly useful for monitoring residue spread from a spreader tool of an agricultural machine where the process may be erratic in terms of movement of individual pieces of residue and where the exact position of each individual piece of residue is not necessary or indeed particularly useful, but where the overall distribution of the residue material provides a better indication of the operation of the spreader tool. This arrangement may also reduce processing requirements for determining the residue distribution by not requiring analysis of each individual residue piece, but the distribution as a whole. Therefore, the present invention advantageously intentionally reduces resolution in terms of identifying individual residue pieces to improve the overall monitoring and control of the spreader tool.

The sensor may comprise a transceiver type sensor, having a transmitting component for transmitting a measurement signal and a receiving component for receiving reflected measurement signals. The sensor may comprise a RADAR sensor, LIDAR sensor, infrared sensor, or the like, for example. In presently preferred embodiments the sensor comprises a three-dimensional LIDAR sensor, having a three-dimensional sensing region.

The time period for the data buffer may be determined by a number of scans of the sensor across the sensing region. For example, the data buffer may correspond to a sequence of no more than 10, or at least 10, or at least 50, or at least 100, or at least 1000 scans of the sensing region by the sensor, for example, providing up to a corresponding number of sequential "images" or datasets of the environment covered by the sensing region. As will be appreciated, image objects and in particular individual residue material pieces will move between scans of the sensor, and as such the data buffer will include multiple positions for each residue piece over the time period covered by the data buffer, up to the number scans making up the data buffer. As described herein, the one or more controllers are configured to determine the distribution of material from the data buffer and whilst having multiple data points for each residue piece may reduce resolution in terms of identifying individual pieces, this arrangement instead provides a clearer understanding of the overall shape and uniformity of the spread pattern provided by the spreader tool.

The time period may, in some embodiments, be user selectable. For example, in use an operator of the agricultural machine may be able to select a time period for the buffer in order to try and optimise or at least improve any obtained visualisation of the residue spread.

The time period may be no more than 1 second, or may be at least 1 second, or at least 2 seconds, or at least 5 seconds, or at least 10 seconds, for example.

The data buffer may be updated continually whilst the system is operational. For example, once full, additional sensor data received from the sensor may replace the "oldest" sensor data stored in the data buffer (that is the sensor data received at the earliest time point and still stored within the data buffer). In this way, the system may be configured such that the data buffer provides a moving window of the most recently received sensor data from the sensor. The residue distribution may be determined on a continual basis and be continually updated such that the one or more operating parameters of the machine (or its components thereof) are controlled in real time based on the most recently received sensor data.

The system may be configured to filter the data received from the sensor. This may comprise downsampling the data received from the sensor. This may comprise the application of a VoxelGrid filter to the sensor data. Advantageously, this may reduce processing requirements, and whilst this may reduce resolution in terms of identifying individual pieces, the overall shape and uniformity of the spread pattern provided by the spreader tool may still be determined.

The sensor is mounted or otherwise coupled to the agricultural machine to provide the sensing region rearward of the machine. For example, in embodiments the sensor is mounted on the rear of the agricultural machine.

The sensor may be mounted on the rear of the machine and orientated such that the sensing direction of the sensor is substantially parallel to a ground surface over which the machine travels, in use. In such embodiments, the sensor may be mounted proximal to the spreader tool, e.g. directly above or below the spreader tool (or an outlet thereof through which the residue material is ejected, in use). In further embodiments, the sensor is mounted above the spreader tool, and orientated such that its sensing direction is angled downwards towards the ground surface onto which the residue material is ultimately spread by the spreader tool.

The one or more operating parameters may include operating parameters of the spreader tool. The spreader tool may include a steering mechanism, and the system may be operable to control one or more operating parameters of the steering mechanism to control the distribution of residue material from the spreader tool. For example, the steering mechanism may include one or more steering vanes or deflectors, and the system may be operable to control a position (e.g. a rotational position) of the steering vane(s) or deflector(s) to control a direction of deflection therefrom.

The steering mechanism may include a first steering unit for controlling the distribution of residue material from the spreader tool in a first direction. The steering mechanism may include a second steering unit for controlling distribution of residue material from the spreader tool in a second direction. The first and second directions may comprise opposing directions parallel to a lateral axis of the machine—e.g. left and right sides of the combine with respect to the direction of travel.

The steering mechanism may include one or more rotors operable to provide a motive force for the residue material through the steering mechanism. For example, the rotor(s) may provide or induce an airflow through the steering mechanism, or may be operable to provide the motive force through contacting the residue material with one or more moveable elements of the rotor—e.g. a rotatable element. The steering mechanism may comprise a first steering unit in the form of a first rotor for controlling movement of residue material through and out of the steering mechanism in generally the first direction and/or a second steering unit in the form of a second rotor for controlling movement of residue material through and out of the steering mechanism in generally the second direction. The system may be operable to control operation of the first and/or second rotor (e.g. a first operating parameter of the spreader tool may relate to the operation of the first rotor and a second operating parameter of the spreader tool may relate to the operation of the second rotor), for example, by controlling a rotational speed of the first and/or second rotor to control distribution of residue material in the first and/or second directions. It will be appreciated that the speed at which the rotors operate may be used to control the extent to which the residue material is distributed from the spreader tool. Accordingly, the system may be operable to control a speed of the first and/or second rotors (e.g. a rotational speed of a rotatable element of the rotor(s). For example, the system may be operable to increase the speed of the first rotor to increase a distance at which the residue material is distributed in a first direction. Likewise, the system may be operable to increase the speed of the second rotor to increase a distance at which the residue material is distributed in a second direction. The system may be operable to decrease the speed of the first and/or second rotor to decrease a distance at which the residue material is distributed in the first/second direction.

Where present, the first and/or second rotors may be provided in combination with fixed or moveable steering vane(s)/deflector(s).

The system may be operable to control the first steering unit and the second steering unit independently, such that the distribution of residue material from the spreader tool in the first direction and the second direction may be controlled generally independently from one another.

The system may be operable to control one or more operating parameters of the agricultural machine itself, which may be a forward speed, turning angle etc. of the agricultural machine, for example.

In embodiments, the system of the present aspect of the invention may be configured to control operation of a user interface, e.g. a display means, which may provide information, for example to an operator of the agricultural machine corresponding to the observed residue material distribution. This may comprise visually illustrating the observed distribution. The visual illustration of the determined material distribution may comprise raw sensor data, or may comprise a graphical illustration of the sensor data more suited to an operator of the machine. Additionally or alternatively, an audible or visual indicator may be provided to the operator of the observed residue distribution. For example, the user interface may be operable to or be instructed by the one or more controllers (e.g. through control signals output by the one or more controllers) to display or otherwise indicate an error state when the observed residue distribution differs from a predetermined state (which may be user selected). For example, an operator may select a desired relative distribution of the residue material, e.g. 50/50 split between the left hand side and right hand side of the agricultural machine, and the system may be configured to output an indicator if the observed distribution differs from the desired distribution, or differs from the desired distribution by a predetermined amount.

An operator may select a maximum lateral extent for the residue material, e.g. a maximum desired distance for the material to be spread from a centre line corresponding substantially to a centre line through the machine. The system may be configured to automate control over one or more components based on the user selected distance, or may be configured to output one or more suggestions to the operator for one or more adjustments to be made to one or more operating parameters to achieve the user selected distance.

The user interface may be operable to or be instructed by the one or more controllers (e.g. through control signals output by the one or more controllers) to display or otherwise indicate the location of a virtual boundary with respect to the determined residue distribution. For example, the user interface may be used to visually indicate a boundary corresponding to the width of a header coupled to the machine—e.g. this may include one or two lines on the representation indicative of a width of the header with respect to the observed distribution. It may be advantageous to adjust operation of the machine or one or more components thereof to ensure the residue distribution is substantially contained (e.g. does not extend beyond) the width of the header. The user interface may be used to visually indicate the position of a crop edge boundary with respect to the residue distribution. As discussed herein, it may be advantageous to ensure that the residue is not spread into adjacent standing crop. Accordingly, the present invention may advantageously illustrate to a user the position of the crop edge boundary, which may be used to control the residue spread such that it does not extend into the adjacent standing crop. This may comprise a line an image with respect to the graphical representation of the determined residue spread pattern.

In a further aspect of the invention there is provided a control system for controlling the distribution of residue material from a spreader tool of an agricultural machine, the control system comprising one or more controllers, and being configured to: receive sensor data from a sensor having a sensing region rearwards of the agricultural machine, the sensor data being indicative of a measure of residue material within the sensing region; employ a buffer of a predetermined time period for the data received from the sensor; determine, from the data received from the sensor, a distribution of residue material associated with the spreader tool for the predetermined time period; and output one or more control signals for controlling one or more operational parameters of the agricultural machine or one or more components thereof in dependence on the determined distribution.

The one or more controllers may collectively comprise an input (e.g. an electronic input) for receiving one or more input signals comprising the sensor data from the sensor. The one or more controllers may collectively comprise one or more processors (e.g. electronic processors) operable to execute computer readable instructions for controlling operation of the control system, for example to employ the buffer and/or determine the distribution. The one or more processors may be operable to generate one or more control signals for controlling the one or more operational parameters. The one or more controllers may collectively comprise an output (e.g. an electronic output) for outputting the one or more control signals.

The one or more controllers of the control system may be configured in any manner of the one or more controllers of the system described hereinabove with reference to the first aspect of the invention.

According to another aspect of the invention there is provided an agricultural machine comprising the system or control system of any preceding aspect.

Optionally, the agricultural machine may comprise a harvesting vehicle, such as a combine harvester, for example.

In a further aspect of the invention there is provided a method of controlling the distribution of residue material from a spreader tool of an agricultural machine, the method comprising: receiving sensor data from a sensor having a sensing region rearwards of the agricultural machine, the sensor data being indicative of a measure of residue material within the sensing region; employing a buffer of a predetermined time period for the data received from the sensor; determining, from the data received from the sensor, a distribution of residue material associated with the spreader tool for the predetermined time period; and controlling one or more operational parameters of the agricultural machine or one or more components thereof in dependence on the determined distribution.

The method may comprise determining the time period for the data buffer in dependence on a number of scans of the sensor across the sensing region. For example, the data buffer may correspond to a sequence of no more than 10, or at least 10, or at least 50, or at least 100, or at least 1000 scans of the sensing region by the sensor, for example, providing up to a corresponding number of sequential "images" or datasets of the environment covered by the sensing region.

In embodiments, the method may comprise receiving a user input indicative of a selected or desired time period. Advantageously, an operator of the agricultural machine may be able to select a time period for the buffer in order to try and optimise or at least improve any obtained visualisation of the residue spread.

The method may comprise continually updating the data buffer whilst the system is operational. For example, once full, additional sensor data received from the sensor may replace the "oldest" sensor data stored in the data buffer (that is the sensor data received at the earliest time point and still stored within the data buffer). In this way, the method may employ a moving window of the most recently received sensor data from the sensor. The residue distribution may be determined on a continual basis and be continually updated such that the one or more operating parameters of the machine (or its components thereof) are controlled in real time based on the most recently received sensor data.

The method may comprise applying a filter to the data received from the sensor. This may comprise downsampling the data received from the sensor. This may comprise the application of a VoxelGrid filter to the sensor data. Advantageously, this may reduce processing requirements, and whilst this may reduce resolution in terms of identifying individual pieces, the overall shape and uniformity of the spread pattern provided by the spreader tool may still be determined.

The one or more operating parameters may include operating parameters of the spreader tool. The spreader tool may include a steering mechanism, and the method may comprise controlling one or more operating parameters of the steering mechanism to control the distribution of residue material from the spreader tool. For example, the steering mechanism may include one or more steering vanes or deflectors, and the method may comprise controlling a position (e.g. a rotational position) of the steering vane(s) or deflector(s) to control a direction of deflection therefrom.

The steering mechanism may include a first steering unit for controlling the distribution of residue material from the spreader tool in a first direction. The steering mechanism may include a second steering unit for controlling distribution of residue material from the spreader tool in a second direction. The first and second directions may comprise opposing directions parallel to a lateral axis of the machine—e.g. left and right sides of the combine with respect to the direction of travel.

The steering mechanism may include one or more rotors operable to provide a motive force for the residue material through the steering mechanism. For example, the rotor(s) may provide or induce an airflow through the steering mechanism, or may be operable to provide the motive force through contacting the residue material with one or more moveable elements of the rotor—e.g. a rotatable element. The steering mechanism may comprise a first steering unit in the form of a first rotor for controlling movement of residue material through and out of the steering mechanism in generally the first direction and/or a second steering unit in the form of a second rotor for controlling movement of residue material through and out of the steering mechanism in generally the second direction. The method may comprise controlling operation of the first and/or second rotor (e.g. a first operating parameter of the spreader tool may relate to the operation of the first rotor and a second operating parameter of the spreader tool may relate to the operation of the second rotor), for example, by controlling a rotational speed of the first and/or second rotor to control distribution of residue material in the first and/or second directions. It will be appreciated that the speed at which the rotors operate may be used to control the extent to which the residue material is distributed from the spreader tool. Accordingly, the method may comprise controlling a speed of the first and/or second rotors (e.g. a rotational speed of a rotatable element of the rotor(s). For example, the method may comprise increasing the speed of the first rotor to increase a distance at which the residue material is distributed in a first direction. Likewise, the method may comprise increasing the speed of the second rotor to increase a distance at which the residue material is distributed in a second direction. The method may comprise decreasing the speed of the first and/or second rotor to decrease a distance at which the residue material is distributed in the first/second direction.

Where present, the first and/or second rotors may be provided in combination with fixed or moveable steering vane(s)/deflector(s).

The method may comprise controlling the first steering unit and the second steering unit independently, such that the distribution of residue material from the spreader tool in the first direction and the second direction may be controlled generally independently from one another.

The method may comprise controlling one or more operating parameters of the agricultural machine itself, which may be a forward speed, turning angle etc. of the agricultural machine, for example.

In embodiments, the method may comprise controlling operation of a user interface, e.g. a display means, which may provide information, for example to an operator of the agricultural machine corresponding to the observed residue material distribution. This may comprise visually illustrating the observed distribution. The visual illustration of the determined material distribution may comprise raw sensor data, or may comprise a graphical illustration of the sensor data more suited to an operator of the machine. Additionally or alternatively, an audible or visual indicator may be provided to the operator of the observed residue distribution. For example, the user interface may be operable to display or otherwise indicate an error state when the observed residue distribution differs from a predetermined state (which may be user selected). For example, an operator may select a desired relative distribution of the residue material, e.g. 50/50 split between the left hand side and right hand side of the agricultural machine, and the method may comprise outputting an indicator if the observed distribution differs from the desired distribution, or differs from the desired distribution by a predetermined amount.

The user interface may be used to display or otherwise indicate the location of a virtual boundary with respect to the determined residue distribution. For example, the user interface may be used to visually indicate a boundary corresponding to the width of a header coupled to the machine—e.g. this may include one or two lines on the representation indicative of a width of the header with respect to the observed distribution. It may be advantageous to adjust operation of the machine or one or more components thereof to ensure the residue distribution is substantially contained (e.g. does not extend beyond) the width of the header. The user interface may be used to visually indicate the position of a crop edge boundary with respect to the residue distribution. As discussed herein, it may be advantageous to ensure that the residue is not spread into adjacent standing crop. Accordingly, the present invention may advantageously illustrate to a user the position of the crop edge boundary, which may be used to control the residue spread such that it does not extend into the adjacent standing crop. This may comprise a line an image with respect to the graphical representation of the determined residue spread pattern.

In a further aspect of the invention there is provided computer software comprising computer readable instructions which, when executed by one or more processors, causes performance of the method of the preceding aspect of the invention.

A further aspect of the invention provides a computer readable storage medium comprising the computer software of the preceding aspect of the invention. Optionally, the storage medium comprises a non-transitory computer readable storage medium. Within the scope of this application it should be understood that the various aspects, embodiments, examples and alternatives set out herein, and individual features thereof may be taken independently or in any possible and compatible combination. Where features are described with reference to a single aspect or embodiment, it should be understood that such features are applicable to all aspects and embodiments unless otherwise stated or where such features are incompatible.

BRIEF DESCRIPTION OF THE DRAWINGS

One or more embodiments of the invention will now be described, by way of example only, with reference to the accompanying drawings, in which.

DETAILED DESCRIPTION

Figure 1:
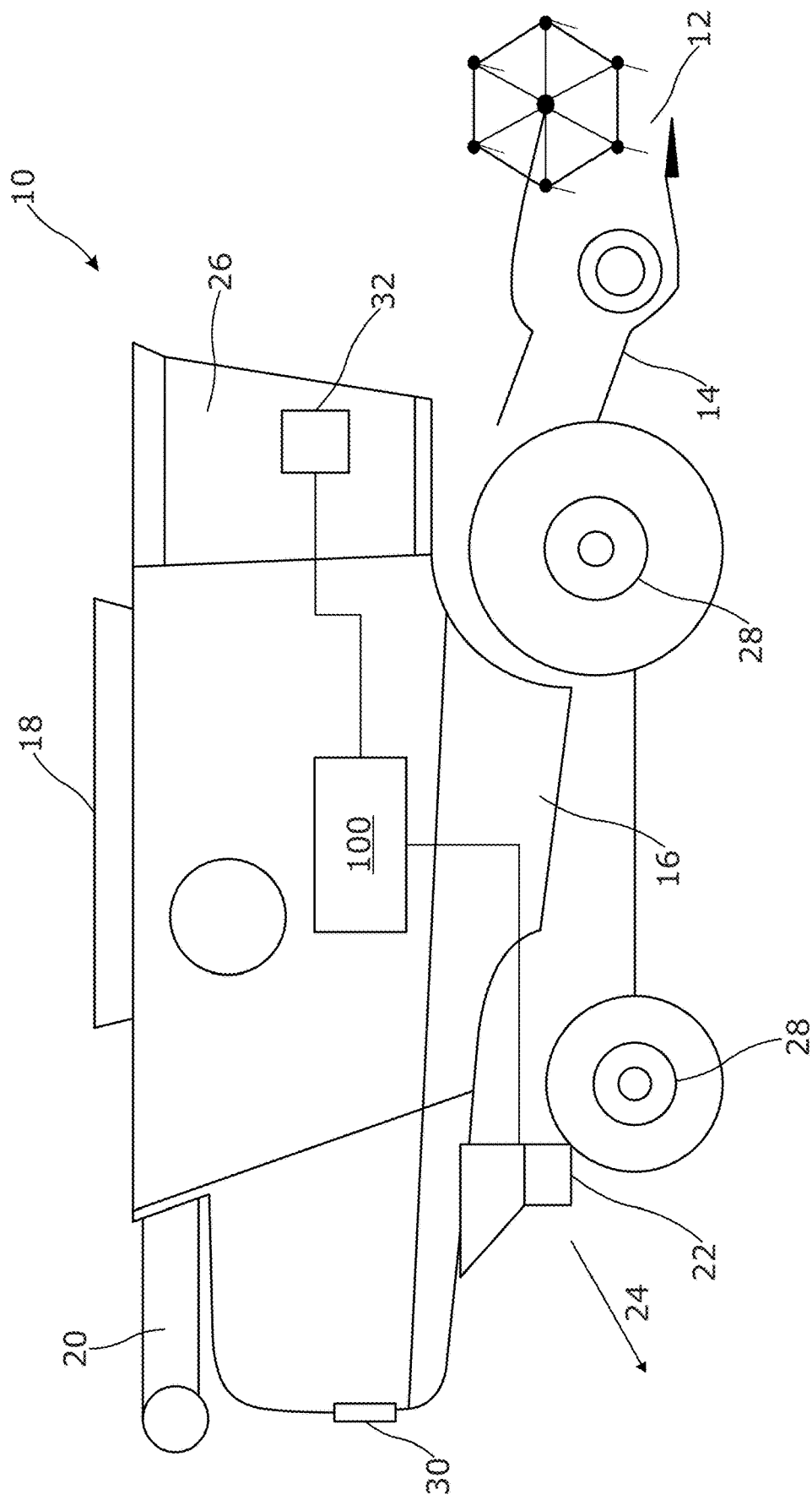
FIG. 1 is a schematic side cross-sectional view of an agricultural harvester embodying aspects of the invention.

FIG. 1 illustrates an agricultural machine, and specifically a combine 10, embodying aspects of the present invention.

The combine 10 is coupled to a header 12 which is operable, in use, to cut and gather a strip of crop material as the combine 10 is driven across a field/area to be harvested during a harvesting operation. A conveyor section 14 conveys the cut crop material from the header 12 into a crop processing apparatus 16 operable to separate grain and non-grain (i.e. material other than grain (MOG) or residue material (used interchangeably herein)) as will be appreciated. It is noted here that apparatus for separating grain and non-grain material are well-known in the art and the present invention is not limited in this sense. The skilled person will appreciate that numerous different configurations for the crop processing apparatus may be used as appropriate. Clean grain separated from the cut crop material is collected in a grain bin 18, which may be periodically emptied, e.g. into a collection vehicle, storage container, etc. utilising unloading auger 20. The remaining non-grain material (MOG)/residue material is separately moved to a spreader tool 22 which is operable in use to eject the non-grain material or MOG from the rear of the combine 10 and onto the ground. In FIG. 1, this is represented by arrow 24 which illustrates the MOG being ejected rearwards from the combine 10. It will be appreciated that in some embodiments the combine 10 may also include a chopper tool positioned, for example, between the crop processing apparatus 16 and the spreader tool 22 and operable, in use, to cut the residue material before it is spread by the spreader tool 22.

The combine 10 also typically includes, amongst other features, an operator cab 26, wheels 28, engine (not shown) and a user interface 32.

As will be discussed in detail herein, the combine 10 additionally includes a sensor in the form of a three-dimensional LIDAR unit 30. As will be appreciated, the LIDAR unit 30 is a transceiver type sensing unit, having a transmitter component for transmitting measurement signals, and a receiver component for receiving reflected measurement signals from objects within the environment of the combine 10. The LIDAR unit is used, by a control system 100 of the combine, to determine a distribution of residue material associated with the spreader tool 22 in the manner discussed herein.

Figure 2:
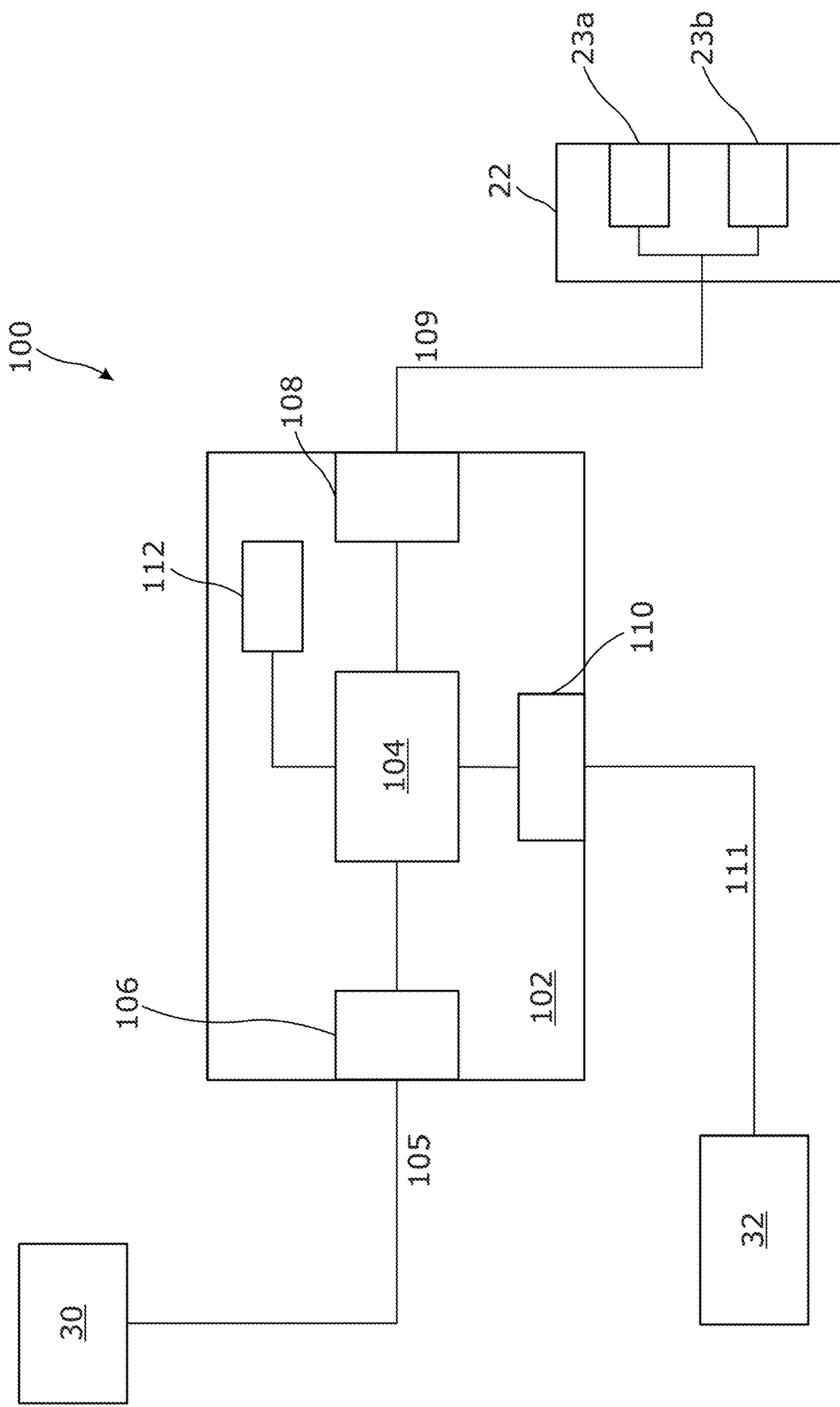
FIG. 2 is a schematic view of an embodiment of a control system of the invention.

FIG. 2 illustrates control system 100 further. As shown, control system 100 comprises a controller 102 having an electronic processor 104, an electronic input 106 and electronic outputs 108, 110. The processor 104 is operable to access a memory 112 of the controller 102 and execute instructions stored therein to perform the steps and functionality of the present invention, for example to output control signals 109 via the output 108 for controlling operation of the spreader tool 22, and more specifically first and second steering units of the spreader tool 22, here in the form of a first rotor 23a and a second rotor 23b, for controlling the distribution of residue material ejected from the spreader tool 22, or for controlling the user interface 32, for example to provide an image to an operator of the combine 10 illustrative of the observed residue material distribution.

The processor 104 is operable to receive sensor data via input 106 which, in the illustrated embodiment, takes the form of input signals 105 received from the LIDAR unit 30. As described in detail herein, the LIDAR unit 30 has a sensing region rearward of the combine 10, with the sensor data received from the LIDAR unit 30 being indicative of a measure of residue material within the sensing region. Using this information, the processor 104 is operable to determine a residue material distribution in the manner described herein. Specifically, the processor 104 is operable to store data received from the LIDAR unit 30 in a data buffer of multiple scans of the LIDAR unit 30 of the sensing region. The stored data is used to determine the residue distribution, rather than individual datasets from each individual scan of the LIDAR unit 30. Advantageously, a clearer picture of the overall shape of the distribution can be determined from the stored data—see below.

In a variant of the invention included in the illustrated embodiment in FIG. 2, output 110 is operably coupled to the user interface 32 of the combine 10. Here, the control system 100 is operable to control operation of the user interface 32, e.g. through output of control signals 111 in order to display operational data to an operator of the combine 10 relating to the operation of the control system 100. Specifically, the control system 100 may be operable to control the user interface 32 to display to the operator a graphical representation of the residue material distribution from the spreader tool 22 as determined by processor 104, image data obtained from a camera on the combine 10, or other useful information. The user interface 32 may also be operable to receive a user input from the operator, and in such instances the output 110 may act as an input for receiving that user input at the processor 104. The user input may relate to a requested or desired distribution of residue material, for example, made by the operator of the combine 10.

Figure 3:
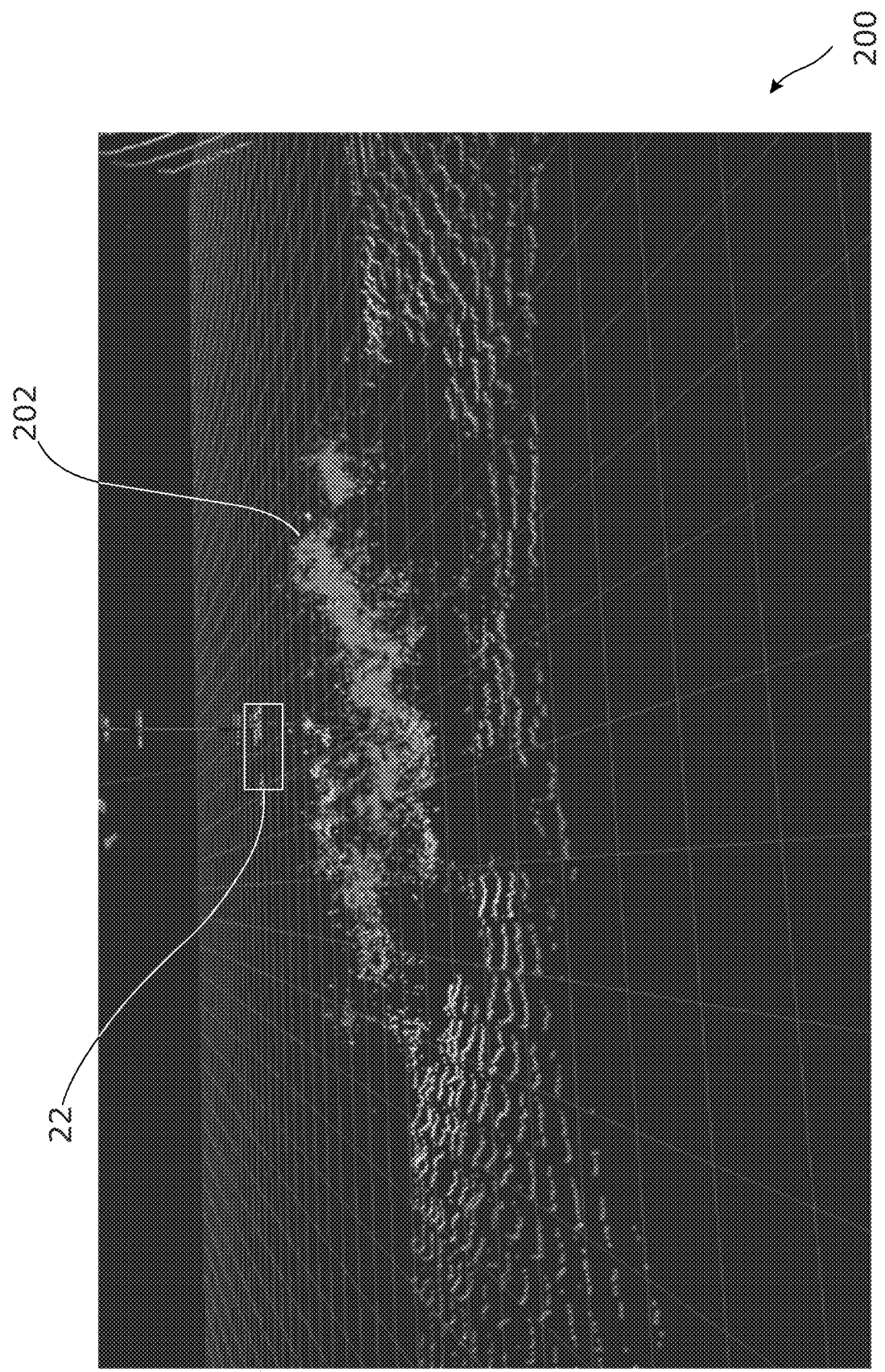
FIG. 3 illustrates sensor data obtained by an arrangement not in accordance with the present invention.
Figure 4:
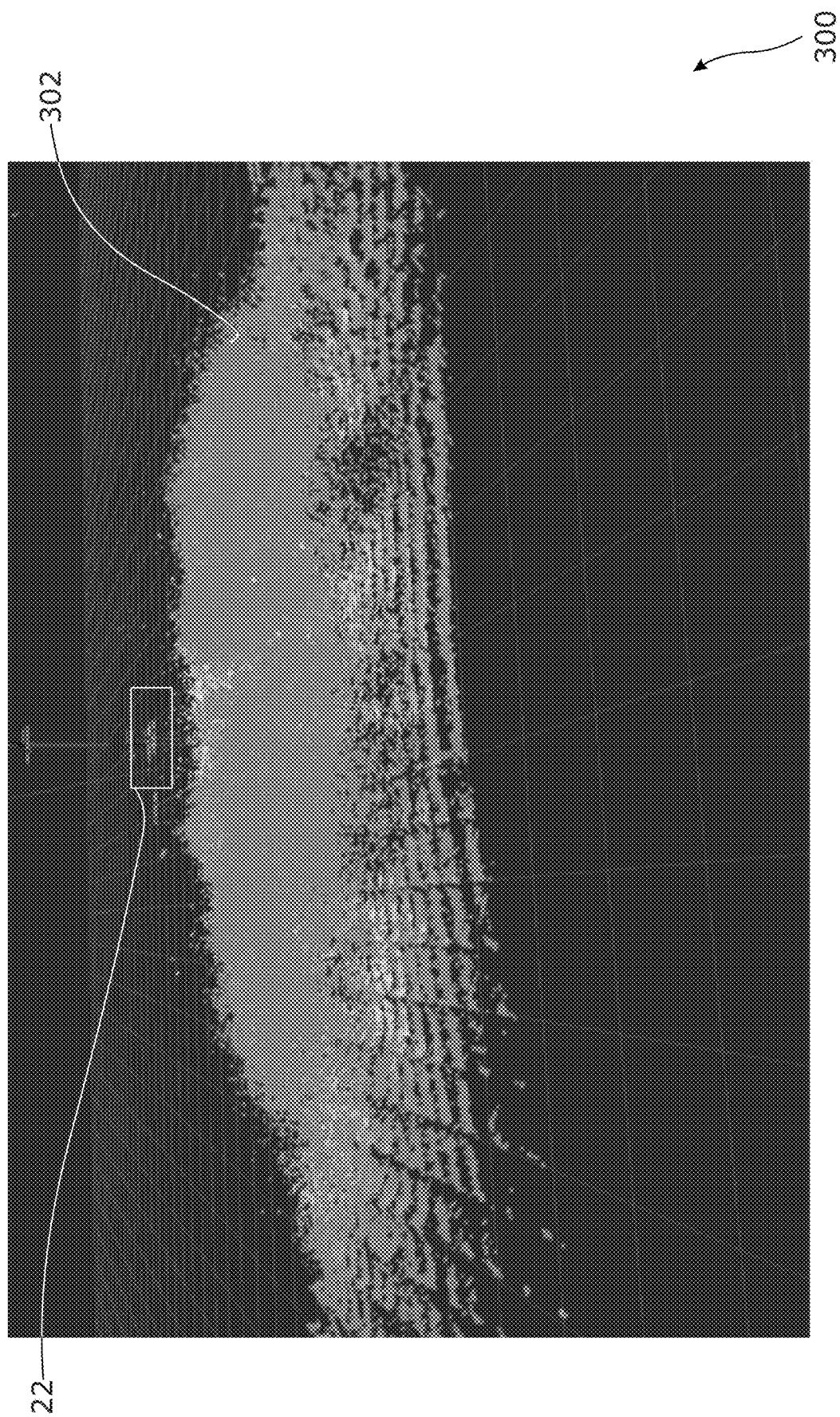
FIG. 4 illustrates sensor data obtained and processed by an arrangement in accordance with the present invention.

FIGS. 3 and 4 illustrate the operational use of aspects of the invention.

As discussed herein, aspects of the invention relate to the use of a data buffer for the data received from the LIDAR unit 30. Specifically, multiple scans are performed by the LIDAR unit 30, and the data obtained from those scans are stored in a data buffer from which the processor 104 determines the residue distribution. As will be appreciated, image objects and in particular individual residue material pieces will move between scans of the sensor, and as such the data buffer will include multiple positions for each residue piece over the time period covered by the data buffer, up to the number scans making up the data buffer. The processor 104 is configured to determine the distribution of material from the data buffer and whilst having multiple data points for each residue piece may reduce resolution in terms of identifying individual pieces, this arrangement instead provides a clearer understanding of the overall shape and uniformity of the spread pattern provided by the spreader tool. This is illustrated graphically by FIGS. 3 and 4.

FIG. 3 shows graphically data associated with a single scan 200 of the LIDAR unit 30. A single scan is essentially a snapshot of the position of individual residue pieces in time, with the resultant scan 200 showing a fairly erratic distribution 202 which is on one hand difficult to analyse and extract useful information therefrom (at least in terms of the overall shape and uniformity of the residue distribution), and secondly difficult to understand pictorially by an operator of the combine 10.

Accordingly, the present invention utilises a data buffer storing information from multiple sequential scans of the LIDAR unit 30. FIG. 4 illustrates this, and is again a graphical representation of data obtained by the LDIAR unit, but here is associated with multiple sequential scans 300 of the LIDAR unit 30, i.e. the data stored in the data buffer. Whilst resolution is lost in terms of individual residue material pieces, a better understanding is provided in terms of the overall shape and uniformity of the residue distribution 302 itself, both for an operator looking at this data and also for further processing steps to extract useful parameters of the observed distribution.

An overall shape of the material distribution can be extracted from the data illustrated by FIG. 4. Specifically, the processor 104 may be configured to identify a boundary of residue material, i.e. the greatest extent in any given direction that the residue material is being spread by the spreader tool 22. For example, the processor 104 may be configured to analyse the sensor data to identify for a step or other variation in the data representing an interface between residue material and the background. This may include determining a height at which the material is being ejected from the spreader tool 22, or a maximum lateral distance at which the material is being ejected from the spreader tool 22. This may be particularly important in terms of determining whether the material is being spread into adjacent standing crop. The processor may be configured to output control signals 109 via electronic output 108 to spreader tool 22, and specifically to first and second rotors 23a, 23b to adjust operation thereof, e.g. to reduce the speed of the rotor 23a, 23b associated with the side of the combine 10 proximal to the standing crop, or in some instances adjust the orientation of one or more steering vanes (not shown) where it is determined that the residue material is being spread into the standing crop to reduce the maximum lateral distance at which the residue material is being spread by the spreader tool 22 in that direction. The opposite use case may also apply, where the residue is not being spread up to the adjacent standing crop, and in such instances output control signals 109 via electronic output 108 to spreader tool 22, and specifically to first and second rotors 23a, 23b to adjust operation thereof, e.g. to increase the speed of the rotor 23a, 23b associated with the side of the combine 10 proximal to the standing crop, or in some instances adjust the orientation of one or more steering vanes.

With the sensor data illustrated by FIG. 4 the processor 104 is further able to determine whether the residue material distribution is skewed left or right, or is substantially uniform. Looking at FIG. 4 specifically, any skewness in the distribution would be shown as a higher density of data points on one side of a central axis (e.g. a central longitudinal axis of the combine 10 running through the middle of the spreader tool 22) compared with the other. For example, if a higher volume of material is determined on the left side of the combine 10 (in the orientation shown in FIG. 4), then it is possible to infer that the distribution of residue material is skewed to the left and appropriate action may be taken based thereon. For example, control signals 109 may be output via electronic output 108 to spreader tool 22, and specifically to first and second rotors 23a, 23b to adjust operation thereof, e.g. to reduce the speed of the left rotor 23a and/or increase the speed of the right rotor 23b, or in some instances adjust the orientation of one or more steering vanes (not shown) to reduce the skewedness of the residue distribution profile—essentially by increasing the volume of material ejected generally in the direction to the right of FIG. 4 and/or reduce the volume of material ejected generally in the direction to the left of FIG. 4.

Figure 5:
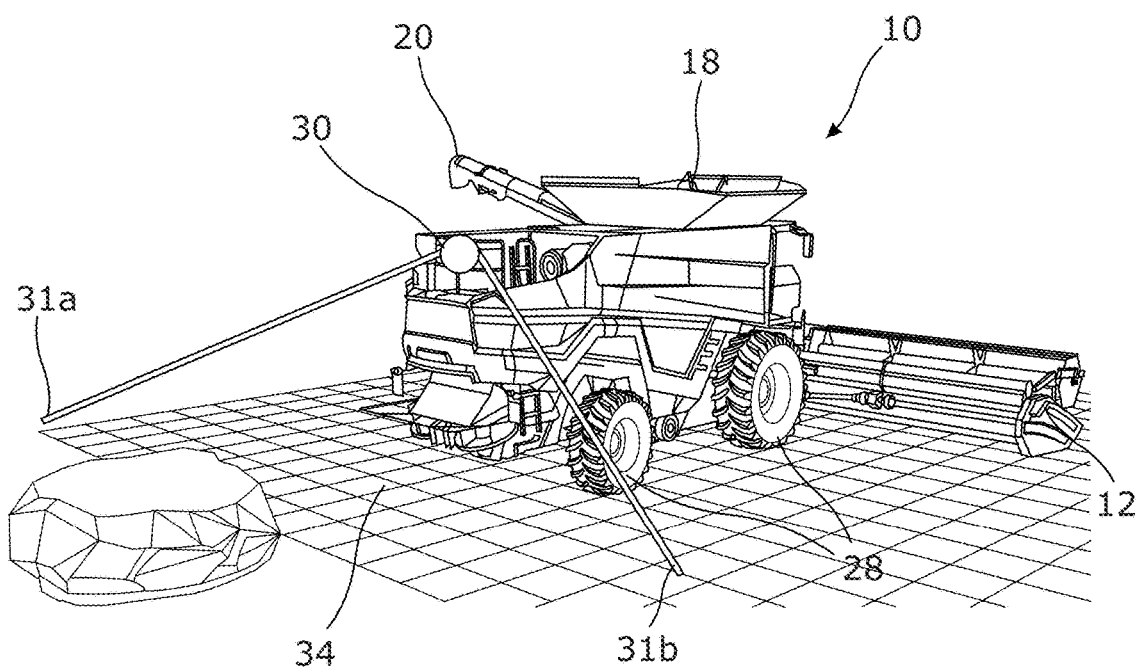
FIG. 5 is a perspective view of a combine harvester embodying a first embodiment of the present invention.
Figure 6:
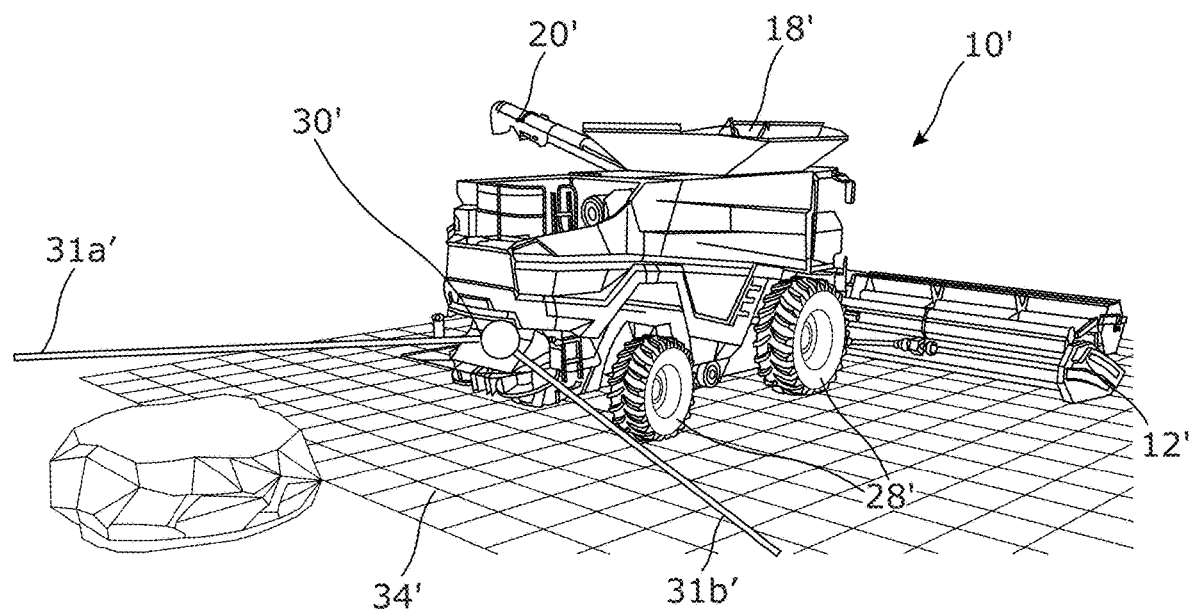
FIG. 6 is a perspective view of a combine harvester embodying a second embodiment of the present invention.

FIGS. 5 and 6 illustrate two separate embodiments of a combine 10, 10'. The combines 10, 10' are configured in substantially the same manner, and each employ a system comprising a control system 100 and an associated sensor in the form of LIDAR unit 30, 30'. The embodiments differ in the location of the LIDAR unit 30, 30 on the respective combine 10, 10'. Specifically, in FIG. 5, the LIDAR unit 30 is mounted to the combine 10 above the spreader tool 22, and orientated such that its sensing region 34 is angled downwards towards the ground surface onto which the residue material is ultimately spread by the spreader tool 22. The sensing region 34 is delineated by sensing boundaries 31a, 31b as shown in FIG. 5. In FIG. 6, the LIDAR unit 30' is mounted on the rear of combine 10' and orientated such that the sensing region 34' is substantially parallel to a ground surface over which the combine 10' travels, in use. Here, the LIDAR unit is mounted proximal to and directly above the spreader tool 22'. The sensing region 34' is delineated by sensing boundaries 31a', 31b' as shown in FIG. 6.

Any process descriptions or blocks in flow diagrams should be understood as representing modules, segments, or portions of code which include one or more executable instructions for implementing specific logical functions or steps in the process, and alternate implementations are included within the scope of the embodiments in which functions may be executed out of order from that shown or discussed, including substantially concurrently or in reverse order, depending on the functionality involved, as would be understood by those reasonably skilled in the art of the present disclosure.

It will be appreciated that embodiments of the present invention can be realised in the form of hardware, software or a combination of hardware and software. Any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape. It will be appreciated that the storage devices and storage media are embodiments of machine-readable storage that are suitable for storing a program or programs that, when executed, implement embodiments of the present invention. Accordingly, embodiments provide a program comprising code for implementing a system or method as set out herein and a machine readable storage storing such a program. Still further, embodiments of the present invention may be conveyed electronically via any medium such as a communication signal carried over a wired or wireless connection and embodiments suitably encompass the same.

It will be appreciated that the above embodiments are discussed by way of example only. Various changes and modifications can be made without departing from the scope of the present application.

The invention claimed is:

1. A system for controlling the distribution of residue material from a spreader tool of an agricultural machine, the system comprising:
    a sensor having a sensing region rearwards of the agricultural machine; and
    one or more controllers, configured to:
        receive data from the sensor indicative of a measure of residue material within the sensing region;
        employ a data buffer of a predetermined time period for the data received from the sensor;
        determine, from the data buffer of sensor data received from the sensor, a distribution of residue material associated with the spreader tool for the predetermined time period associated with the buffer; and
        output one or more control signals for controlling one or more operational parameters of the agricultural machine or one or more components thereof in dependence on the determined distribution.

2. A system as claimed in claim 1, wherein the sensor comprises a three-dimensional LIDAR sensor, having a three-dimensional sensing region.

3. A system as claimed in claim 1, wherein the sensor is a scanning sensor, and where the time period for the data buffer is determined in dependence on a number of scans of the sensor across the sensing region.

4. A system as claimed in claim 1, wherein the time period is user selectable.

5. A system as claimed in claim 1, wherein the data buffer is updated continually while the system is operational.

6. A system as claimed in claim 5, wherein the residue distribution is determined on a continual basis and is continually updated such that the one or more operational parameters of the machine are controlled in real time based on the most recently received sensor data.

7. A system as claimed in claim 1, wherein the sensor is mounted or otherwise coupled on the rear of the agricultural machine, and orientated such that:
    the sensing direction of the sensor is substantially parallel to a ground surface over which the machine travels, in use; or
    the sensing direction of the sensor is angled downwards towards the ground surface onto which the residue material is ultimately spread by the spreader tool.

8. A system as claimed in claim 1, wherein the one or more operational parameters include one or more operational parameters of the spreader tool.

9. A system as claimed in claim 8, wherein the spreader tool includes a steering mechanism, and the system is operable to control one or more operational parameters of the steering mechanism to control the distribution of residue material from the spreader tool.

10. A system as claimed in claim 9, wherein the steering mechanism includes one or more steering vanes or deflectors, and the system is operable to control a position of the steering vane(s) or deflector(s) to control a direction of deflection therefrom.

11. A system as claimed in claim 9, wherein the steering mechanism includes a first steering unit for controlling the distribution of residue material from the spreader tool in a first direction and a second steering unit for controlling distribution of residue material from the spreader tool in a second direction; and wherein the system is operable to control operation of the first and/or second steering units to control the distribution of material from the spreader tool.

12. A system as claimed in claim 1, configured to control a forward speed of the agricultural machine in dependence on the determined residue distribution.

13. A system as claimed in claim 1, configured to control operation of a user interface to provide information corresponding to the determined residue material distribution.

14. A system as claimed in claim 13, wherein the information comprises a visual representation of the determined material distribution including a graphical illustration of the sensor data.

15. An agricultural machine comprising the system of claim 1.

16. A method of controlling the distribution of residue material from a spreader tool of an agricultural machine, the method comprising:
    receiving sensor data from a sensor having a sensing region rearwards of the agricultural machine, the sensor data being indicative of a measure of residue material within the sensing region;
    employing a data buffer of a predetermined time period for the data received from the sensor;
    determining, from the data received from the sensor, a distribution of residue material associated with the spreader tool for the predetermined time period; and
    controlling one or more operational parameters of the agricultural machine or one or more components thereof in dependence on the determined distribution.

* * * * *